United States Patent [19]

Dela Ruye

[11] 4,339,541
[45] Jul. 13, 1982

[54] MANUFACTURE OF TINTED GLASS

[75] Inventor: Jacques Dela Ruye, Montignies le Tilleul, Belgium

[73] Assignee: BFG Glassgroup, Paris, France

[21] Appl. No.: 238,504

[22] Filed: Feb. 26, 1981

[30] Foreign Application Priority Data

Mar. 4, 1980 [GB] United Kingdom ............... 8007370

[51] Int. Cl.³ ..................... C03C 3/04; C03C 3/10
[52] U.S. Cl. ............................. 501/71; 501/68; 501/72
[58] Field of Search .................... 501/71, 72, 68

[56] References Cited

U.S. PATENT DOCUMENTS

| | | | |
|---|---|---|---|
| 2,938,808 | 5/1960 | Duncan et al. | 501/71 |
| 3,024,121 | 3/1962 | Hagedorn | 501/71 |
| 3,723,142 | 3/1973 | Kato et al. | 501/71 |
| 3,881,905 | 5/1975 | Cramer et al. | 65/99.4 |
| 4,101,705 | 7/1978 | Fischer et al. | 501/71 |
| 4,104,076 | 8/1978 | Pons | 501/71 |

*Primary Examiner*—Mark Bell
*Attorney, Agent, or Firm*—Spencer & Kaye

[57] ABSTRACT

Soda-lime glass contains by weight the following glass forming oxides:

| | |
|---|---|
| $SiO_2$ | 60 to 75% |
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% |

In order to produce a tinted glass having favorable properties as regards its cost, color and freedom from haze, the following coloring agents (proportions by weight) are incorporated in the glass:

| | | | |
|---|---|---|---|
| $Fe_2O_3$ | 0.3 | to | 0.5% |
| $Cr_2O_3$ | 0.0075 | to | 0.0230% |
| Se | 0.0005 | to | 0.0019% |
| Co | 0.0040 | to | 0.0070% |
| Ni | 0.0050 | to | 0.0120% |

10 Claims, 2 Drawing Figures

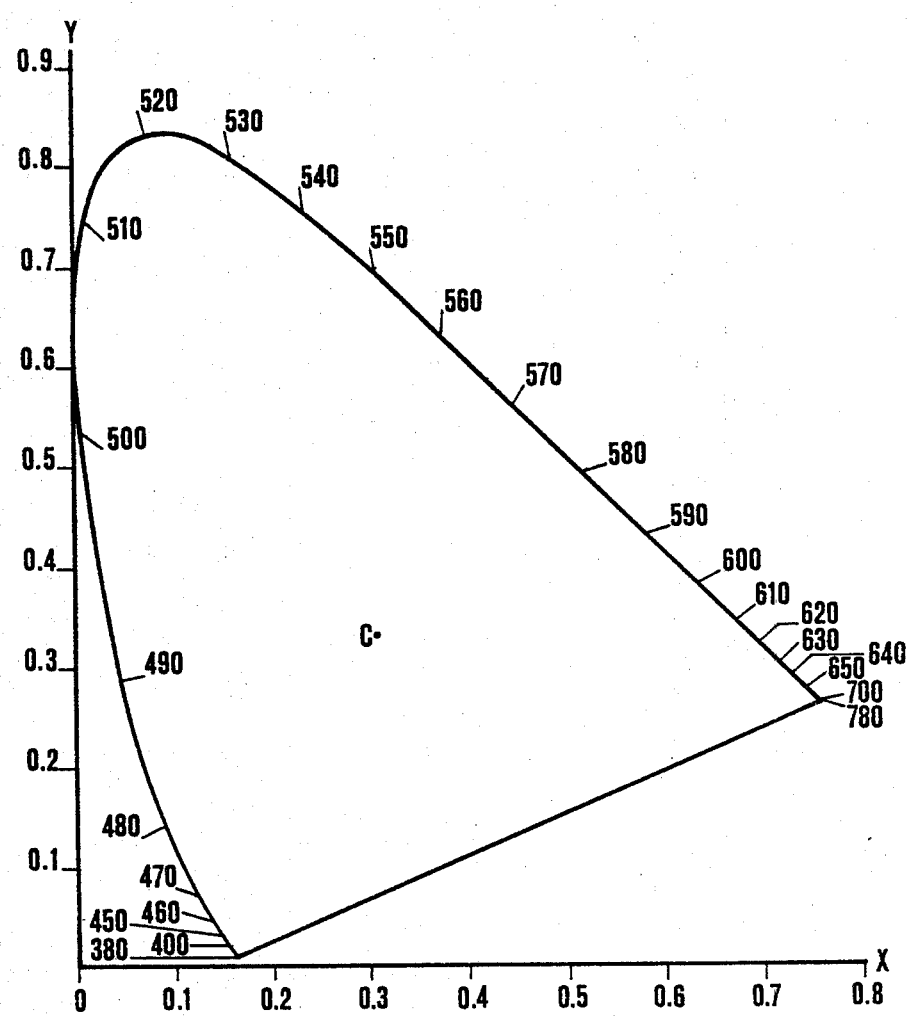

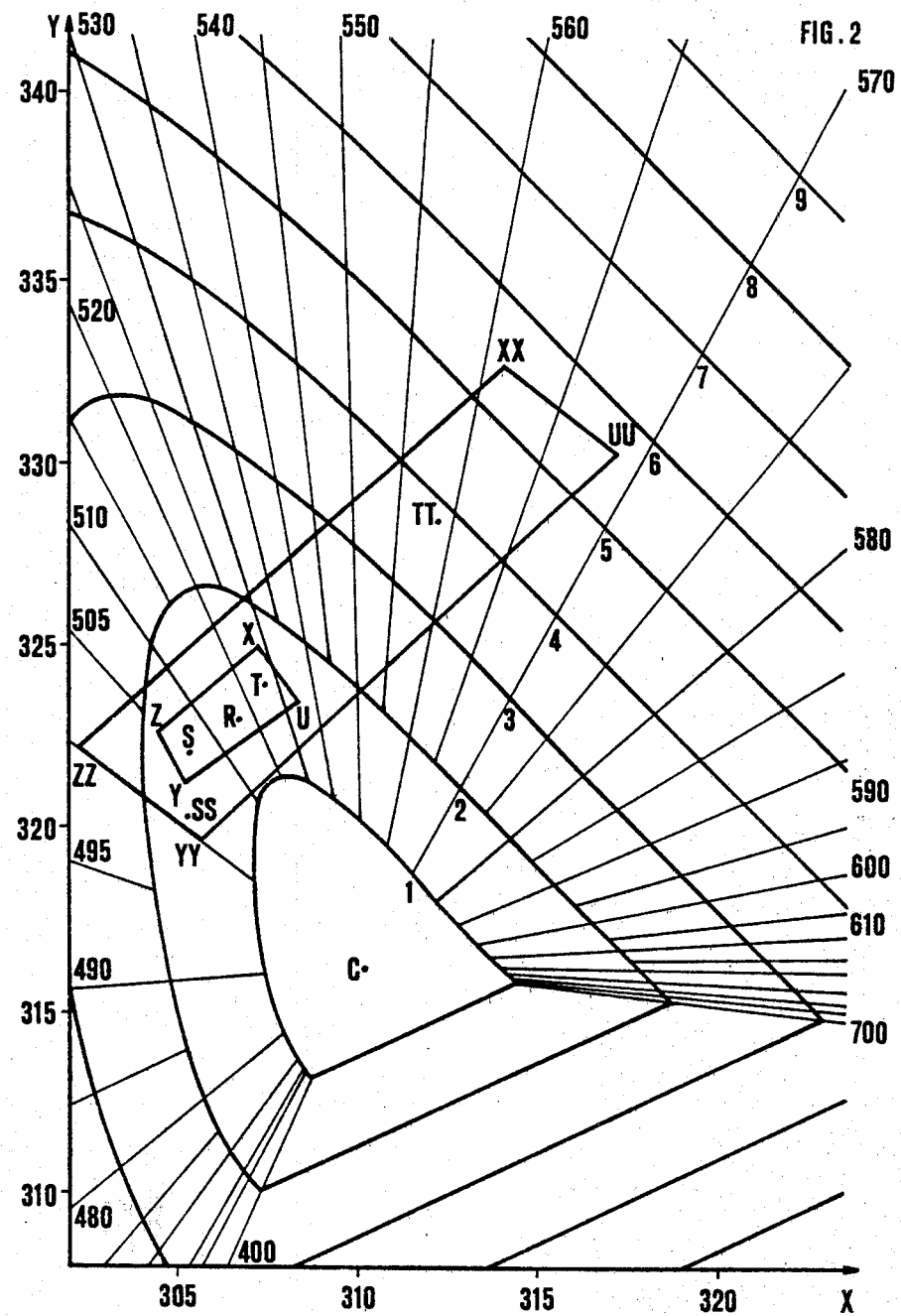

MANUFACTURE OF TINTED GLASS

BACKGROUND OF THE INVENTION

This invention relates to the manufacture of tinted glass.

The apparent colour of a light transmitting body depends on its spectral curve of transmission and this in turn is influenced by the particular light in which it is viewed. Accordingly, it is useful to refer to a particular standard light source. A standard has been established since 1931 by the Commission Internationale d'Eclairage (International Commission on Illumination) (CIE) which defines an illuminant C, nominally an average daylight source having a colour temperature of 6700 K., and a colour diagram on which can be plotted positions relating to the colour of an object viewed in that light.

It is well known that light of any colour can be matched by a suitable mixture of red, green and blue lights, and also that a mixture of two or more colours is matched by a corresponding mixture of their equivalent red, green and blue lights. Thus a units of colour A are matched by r units of Red, g units of Green and b units of Blue, or $$a(A) = rR + gG + bB.$$

This equation is known as the tristimulus equation and r, g and b as the tristimulus values. C.I.E. have defined the particular red, green and blue colours of their system in such a way that the tristimulus values are always positive and the red and blue lights have zero luminous efficiency so that the luminance or brightness of a colour is directly proportional to the green tristimulus value. The reference stimuli defined in this way cannot in fact be achieved in practice, but they are convenient for mathematical analysis.

From the tristimulus equation, it follows that for one unit of colour A:

$$1(A) = \frac{r}{r+g+b} R + \frac{g}{r+g+b} G + \frac{b}{r+g+b} B$$

which may be rewritten as $1(A) = xR + yG + zB$. The terms x, y, z are known as the colour co-ordinates of the colour A, and since their sum is unity, it follows that any colour may be uniquely represented by a pair of trichromatic co-ordinates x, y.

The C.I.E. have defined the colour co-ordinates for light of each wavelength within the visible spectrum and these may be represented diagrammatically on a graph having orthogonal x and y axes to give what is known as the C.I.E. colour diagram.

In the accompanying drawings:

FIG. 1 shows the C.I.E. colour diagram, and

FIG. 2 shows a detail of the central region of that diagram.

In FIG. 1, the locus of colour co-ordinates for light of each wavelength within the visible spectrum is known as the spectrum locus and light whose colour co-ordinates place it on the spectrum locus is taken to have 100% purity of excitation of the appropriate wavelength. The spectrum locus is closed by a line known as the purple line joining the co-ordinate positions on the spectrum locus for 380 nm (violet) and 770 nm (red). Thus the area enclosed by the spectrum locus and the purple line defines the available field for the possible colour co-ordinates of any colour.

By making use of this colour diagram and the underlying theory (of which further details may be found in "Colorimetry, Official Recommendations of the International Commission on Illumination" May 1970, and in "Glass Science and Technology, 2", "Colour Generation and Control in Glass" C. R. Bamford, Elsevier Scientific Publishing Company, Amsterdam, Oxford, N.Y., 1977) it is possible to plot and compare the apparent colours of various bodies when illuminated by a standard light source. For the purpose of this specification, C.I.E. illuminant C has been chosen. The colour co-ordinates of the light emitted by illuminant C are plotted at point C on FIGS. 1 and 2 whose co-ordinates are (0.3101; 0.3163). Point C is taken to represent white light; and accordingly represents zero purity of excitation. It will readily be appreciated that lines can be drawn from point C to the spectrum locus at any desired wavelength, and that any point lying on such a line can be defined not only in terms of its x, y co-ordinates, but also in terms of the wavelength line on which it lies and its distance from point C relative to the total length of that wavelength line. Thus a tinted body can be described in terms of this dominant wavelength and its purity of colour excitation. FIG. 2 shows various dominant wavelength lines and loci of constant purity of excitation increasing in increments of 1%.

Thus when viewed in the light of illuminant C an object whose plotted position lies at point C is perfectly neutral or gray in that it does not distort the perceived colour of the illuminant C, (though it may of course reduce the intensity of the light) and the object is said to have zero purity of colour. It will be appreciated that any object viewed in the light emitted by illuminant C will be apparently neutral if its plotted position lies sufficiently close to the point C. Of course if two such objects are viewed simultaneously, there may be a perceived difference in colour, but when viewed individually, each will appear to be gray.

The expression "gray glass" as used herein denotes glass having a colour purity of less than 6%.

We have referred to the fact that in the CIE system, the luminance or brightness of a colour is proportional to the green tristimulus value. It will be apparent that the amount of light transmitted by a light absorbing, i.e. a tinted, glass will depend not only on the composition of the glass, but also on its thickness. From this it follows that for a given glass composition, the co-ordinate position on the CIE colour diagram obtained will also depend on the glass thickness. Throughout this specification and in the claims, the values given for the colour co-ordinates (x, y), the purity of colour excitation P%, the dominant wavelength λD and the factor of luminance L% of the glass are all measured for, or calculated as being applicable to, sheet glass 5 mm in thickness.

Tinted glass, and especially gray-coloured glass is useful for absorbing visible and infra-red radiation transmission for example in window glazings or to protect materials which might be damaged or destroyed by high light intensity.

It is well known that absorbent glass can be manufactured by adding certain colouring materials to a vitrifiable batch which, in the absence of the colouring materials, would form a clear glass, that is, a glass of high transmissivity. For example it is well known to manufacture glasses having a green, bronze or blue tint, and gray glasses are also known. It is sometimes preferred to manufacture for glazing purposes a glass having a fairly pronounced green tint since this has the least appreciable colour distorting effect on green objects such as grass and the leaves of trees. However it will readily be appreciated that, in order to avoid distorting the colour of any object viewed through the glass that glass should have a low purity of colour, that is, the glass should be gray.

A principal colouring ingredient that has been added to a clear glass batch to form gray glass is nickel oxide which is used in admixture with iron and cobalt oxides. U.S. Pat. No. 3,881,905 (PPG Industries) specifies a glass containing by weight, 0.0800% to 0.1100% nickel oxide which is manufactured by the float process. As is recognised in that patent, it is necessary to ensure that the atmosphere within the float chamber is a reducing atmosphere, in order to prevent oxidation of the bath of molten metal on which the glass ribbon is formed. Unfortunately nickel is easily reduced by such an atmosphere and consequently the glass formed has surface deposits or inclusions of metallic nickel which lead to an unacceptable haze in the glass produced. U.S. Pat. No. 3,881,905 accordingly proposes that the atmosphere in the float chamber should be controlled so that it is slightly oxidizing. This is stated to prevent such haze formation, but it does permit oxidation of the bath of molten metal so, from time to time, a reducing gas, hydrogen, is introduced into the float chamber atmosphere to reduce the oxides formed on the surface of the bath. This introduction of reducing gas leads to a temporary loss of usable glass because of the recurrence of haze.

In addition to the problems peculiar to float glass production, nickel oxide is also known to pollute the furnace in which the batch is melted.

In order to avoid these problems associated with the use of nickel oxide, it has been proposed to eliminate nickel oxide from the batch and substitute other colouring agents, see for example, U.S. Pat. No. 4,104,076 (Saint-Gobain Industries) which proposes the use of iron oxide, cobalt oxide, optionally selenium and either or both of chromium oxide and uranium oxide. In the specific compositions given in U.S. Pat. No. 4,104,076, where uranium oxide is used, uranium oxide is present in amounts slightly in excess of 0.1%. A typical flat glass production rate is between 500 and 700 tonnes per day. Uranium oxide is expensive. In the compositions where uranium oxide is not used, selenium is. Selenium is also expensive, and suffers from the further disadvantage that it is extremely difficult to incorporate in a glass. In fact, about 85% by weight of selenium incorporated in a batch does not enter the glass and it is therefore wasted, so that, in the specific compositions where uranium oxide is not used, selenium is present in the glass in amounts of at least 0.0021% but in order to achieve this level of selenium it is necessary to use 0.14 kg selenium per tonne of glass produced.

SUMMARY OF THE INVENTION

It is an object of the present invention to provide a new composition for the manufacture of tinted glass which allows a favourable compromise to be achieved between the optical quality of the glass (that is to say its degree of freedom from haze), the cost of its manufacture, and its colour.

According to the present invention, there is provided tinted soda-lime glass containing by weight the following main constituents:

| | |
|---|---|
| $SiO_2$ | 60 to 75% |
| $Na_2O$ | 10 to 20% |
| $CaO$ | 0 to 16% |
| $K_2O$ | 0 to 10% |
| $MgO$ | 0 to 10% |
| $Al_2O_3$ | 0 to 5% |
| $BaO$ | 0 to 2% |
| $BaO + CaO + MgO$ | 10 to 20% |
| $K_2O + Na_2O$ | 10 to 20% | characterised in that such glass also contains the following colouring agents (proportions by weight):

| | | | |
|---|---|---|---|
| $Fe_2O_3$ | 0.3 | to | 0.5% |
| $Cr_2O_3$ | 0.0075 | to | 0.0230% |
| Se | 0.0005 | to | 0.0019% |
| Co | 0.0040 | to | 0.0070% |
| Ni | 0.0050 | to | 0.0120% |

DETAILED DESCRIPTION OF THE INVENTION

A glass made in accordance with the invention presents a favourable compromise between its quality, its cost and its colour. The specified proportion range for nickel oxide is high enough that smaller quantities of the more expensive colouring agents are required, and is low enough that the problems normally associated with the use of nickel oxide are greatly reduced and may be eliminated. For example, such proportions of nickel oxide do not appreciably contaminate the furnace in which the glass is melted. The invention is particularly useful in the manufacture of float glass, since the low quantities of nickel oxide used mean that a reducing atmosphere can be maintained continuously in the float chamber to avoid oxidation of the bath without causing an objectionable degree of haze in the glass produced.

By using colouring agents in amounts within these proportion ranges it is possible to manufacture gray glasses, i.e. glasses with a colour purity of less than 6%. This is not to say that every combination of these colouring agents within these ranges will give a glass a colour purity of less than 6%, but it is possible to make an appropriate selection of colouring agents to give that result.

In fact, the different colouring agents used have different properties. Generally, iron is present in the divalent and trivalent states in equilibrium proportions fixed by the remainder of the glass composition and the conditions in the melting furnace. Divalent iron is particularly absorptive of infra-red radiation while trivalent iron absorbs in the ultra violet. Iron as such has very little effect on the colour of the glass and absorbs little visible light, but in the presence of selenium, a chromophore is formed which is strongly absorbent in the visible spectrum and produces a yellowish-orangey dominant. Cobalt oxide is also strongly absorbent in the visible spectrum, though not so much so as the selenium-iron chromophore, and it produces a blue or blue-violet dominant. Nickel oxide (a yellow greenish colour) absorbs moderately in the visible spectrum, and chromium oxide absorbs in the mid-part of the visible spectrum to give a green dominant.

Thus for example if proportions of Ni and $Fe_2O_3$ towards the upper ends of the specified ranges are used, it is also necessary to use more than the minimum amounts of Co in order to reduce the purity of colour of the glass to 6% or less as is preferred.

Advantageously, $Cr_2O_3$ is incorporated in the glass in an amount below 0.0195%. This permits avoidance of too pronounced a greenish tint.

Preferably, a glass made in accordance with the invention incorporates said colouring agents in the following proportions by weight:

| $Fe_2O_3$ | 0.35% | to | 0.45% |
|---|---|---|---|
| $Cr_2O_3$ | 0.0150% | to | 0.0195% |
| Se | 0.0010% | to | 0.00175% |
| Co | 0.0050% | to | 0.0070% |
| Ni | 0.0075% | to | 0.0100% |

By suitable selection of amounts of these colouring agents within these narrower proportion of ranges, it is possible to make a glass having a colour purity of less than 2%.

For commercial and aesthetic reasons, it is preferred that said colouring agents should be incorporated in such relative amounts as to impart to the glass a dominant wavelength in the range 500 nm to 570 nm when viewed by CIE illuminant C. The human eye is usually most sensitive to light within that wavelength range. Optimally, said colouring agents are incorporated in such relative amounts as to impart to the glass a dominant wavelength in the range 500 nm to 540 nm when viewed by CIE illuminant C.

The invention is particularly suitable for the manufacture of glasses whose position on the CIE colour diagram (illuminant C) lies within the smallest quadrilateral enclosing the points (0.3140; 0.3326), (0.3171; 0.3302), (0.3056; 0.3197), (0.3022; 0.3223). These are respectively the points XX, UU, YY, ZZ indicated on FIG. 2.

Advantageously, said colouring agents are incorporated in relative amounts so as to give a position for the glass on the CIE colour diagram (illuminant C) which lies within the smallest quadrilateral enclosing the points (0.3072; 0.3250), (0.3083; 0.3234), (0.3053; 0.3212), (0.3044; 0.3226). These are respectively the points X, U, Y, Z indicated on FIG. 2.

In addition to the characterisation of the colour of a glass by its position on the CIE colour diagram, a further property of the glass may be characterised by its factor of luminance L, usually expressed in percentage terms. The present invention is especially suitable for the manufacture of glasses having a wide range of factors of luminance, especially factors of luminance between 45% and 60%.

The invention is particularly useful for the manufacture of tinted float glass.

The present invention extends to a method of manufacturing tinted glass and accordingly provides a method of manufacturing tinted soda-lime glass comprising vitrifying a batch of glass forming materials in such proportions as to give a glass containing by weight the following main constituents:

| $SiO_2$ | 60 to 75% |
|---|---|
| $Na_2O$ | 10 to 20% |
| CaO | 0 to 16% |
| $K_2O$ | 0 to 10% |

-continued

| MgO | 0 to 10% |
|---|---|
| $Al_2O_3$ | 0 to 5% |
| BaO | 0 to 2% |
| BaO + CaO + MgO | 10 to 20% |
| $K_2O + Na_2O$ | 10 to 20% | characterised in that such colourants are added to said batch in such proportions as to give a glass containing by weight the following colouring agents:

| $Fe_2O_3$ | 0.3 | to | 0.5% |
|---|---|---|---|
| $Cr_2O_3$ | 0.0075 | to | 0.0230% |
| Se | 0.0005 | to | 0.0019% |
| Co | 0.0040 | to | 0.0070% |
| Ni | 0.0050 | to | 0.0120%, | and preferably in such relative proportions as to yield gray glass, and preferably so that the $Cr_2O_3$ content of the glass is below 0.0195%.

This method of manufacturing tinted glass enables a favourable compromise between glass quality and manufacturing costs to be achieved.

Preferably, said colourants are added to said batch in such proportions as to give a glass containing said colouring agents in the following proportions by weight:

| $Fe_2O_3$ | 0.35 | to | 0.45% |
|---|---|---|---|
| $Cr_2O_3$ | 0.0150 | to | 0.0195% |
| Se | 0.0010 | to | 0.00175% |
| Co | 0.0050 | to | 0.0070% |
| Ni | 0.0075 | to | 0.0100% |

Glass manufactured in accordance with the invention is particularly suitable for glazing purposes, and it is accordingly preferred that said glass is manufactured in sheet or ribbon form.

Sheets or ribbons of said glass may be manufactured by any conventional process, for example by the Fourcault or Libbey-Owens process, but the invention presents particular advantages when the glass is manufactured in sheet or ribbon form using the float process in which molten glass is caused to flow onto the surface of a bath of a material of higher relative density than the glass (usually a molten metal such as tin) where the glass forms a ribbon of uniform thickness before being drawn off at one end of the bath and cut into sheets. The reasons for this are as follows: hitherto, in the manufacture of gray glass, either very expensive colouring agents have been used, or relatively large quantities of nickel have been used. If relatively large quantities of nickel are used, the atmosphere in the float tank above the bath of molten metal must be a non-reducing atmosphere, or the glass produced will have unacceptable haze resulting from surface deposits or inclusions of molten nickel. However, if that atmosphere is non-reducing, the bath material will in time become oxidised resulting in surface dross which will adhere to the glass, again giving an unacceptable product. By ensuring that the glass has a nickel content between 0.0050% and 0.0120%, it is possible to reduce the amount of more expensive colouring agents used and also to maintain a continuous reducing atmosphere in the float tank without forming an unacceptable nickel haze.

Table 1 gives compositions of three batches of glass forming materials and the resulting compositions of glasses. In fact the glass forming materials of these batches 1, 2 and 3 result in glasses whose glass forming oxides differ only in the relative amounts of BaO and CaO present, the totals of these alkaline earth metal oxides being the same. Colouring agents can be added to any of these batches in accordance with the invention, and the colouring effect will be substantially the same no matter to which batch a given proportion of colouring agents is added.

TABLE 1

| Batch No. | 1 | 2 | 3 |
|---|---|---|---|
| Batch Composition, kg for 1000 kg glass (Glass formers) | | | |
| Sand | 752.2 | 752.2 | 752.2 |
| Sodium carbonate | 217 | 213 | 223 |
| Barium sulphate | 9 | — | 22 |
| Limestone | 55 | 59 | 50 |
| Dolomite | 167 | 167 | 167 |
| Feldspar | 27 | 27 | 27 |
| Sodium sulphate | 8 | 13 | — |
| Sodium nitrate | 11 | 11 | 11 |
| Glass composition % by weight (Glass main constituents) | | | |
| $SiO_2$ | 72.9 | 72.9 | 72.9 |
| $Na_2O + K_2O$ | 13.77 | 13.77 | 13.77 |
| BaO | 0.59 | — | 1.4 |
| CaO | 8.13 | 8.72 | 7.32 |
| MgO | 3.60 | 3.60 | 3.60 |
| $Al_2O_3$ | 0.72 | 0.72 | 0.72 |

Tables 2 to 4 give thirteen Examples of colourant compositions expressed in metal or in oxides which may be added to any of the glass forming batch compositions set out in Table 1. These tables also indicate for each of the Examples, the analysis of colouring agents incorporated in each glass, its position R, S, T, SS, TT, X, U, Y, Z, XX, UU, YY or ZZ on the C.I.E. colour diagram as calculated for sheet glass having a thickness of 5 mm when illuminated by illuminant C (FIG. 2), the colour co-ordinates x, y of that position, and the factor of luminance L% of the glass produced. The various positions on the colour diagram are also indicated in terms of the dominant wavelength λD of each glass and its purity of colour excitation P%.

TABLE 2

| Example No. | 1 | 2 | 3 | 4 | 5 |
|---|---|---|---|---|---|
| Batch Composition, kg for 1000 kg glass (Colourants) | | | | | |
| $Fe_2O_3$ | 3.000 | 2.920 | 3.450 | 2.520 | 3.900 |
| $Cr_2O_3$ | 0.185 | 0.193 | 0.170 | 0.140 | 0.165 |
| Se | 0.097 | 0.090 | 0.097 | 0.050 | 0.125 |
| CoO | 0.082 | 0.082 | 0.085 | 0.056 | 0.089 |
| NiO | 0.102 | 0.096 | 0.121 | 0.070 | 0.140 |
| Glass Composition % by weight (Colouring agents) | | | | | |
| $Fe_2O_3$ | 0.3700 | 0.3600 | 0.4250 | 0.3100 | 0.4800 |
| $Cr_2O_3$ | 0.0185 | 0.0193 | 0.0170 | 0.0140 | 0.0165 |
| Se | 0.00145 | 0.00135 | 0.00145 | 0.00075 | 0.00188 |
| Co | 0.0064 | 0.0064 | 0.0067 | 0.0044 | 0.0070 |
| Ni | 0.0080 | 0.0075 | 0.0095 | 0.0055 | 0.0110 |
| Position on colour diagram (illuminant C) | R | S | T | SS | TT |
| x | 0.3066 | 0.3053 | 0.3074 | 0.3052 | 0.3122 |
| y | 0.3299 | 0.3220 | 0.3239 | 0.3203 | 0.3283 |
| L % | 51.9 | 52.5 | 50.1 | 59.8 | 46.4 |
| λD (nm) | 516 | 506 | 527 | 501 | 559 |
| P % | 1.3 | 1.6 | 1.5 | 1.6 | 3.8 |

TABLE 3

| Example No. | 6 | 7 | 8 | 9 |
|---|---|---|---|---|
| Batch Composition, kg for 1000 kg glass (Colourants) | | | | |
| $Fe_2O_3$ | 3.310 | 2.830 | 3.170 | 3.580 |
| $Cr_2O_3$ | 0.193 | 0.176 | 0.167 | 0.182 |
| Se | 0.087 | 0.111 | 0.085 | 0.065 |
| CoO | 0.079 | 0.079 | 0.083 | 0.082 |
| NiO | 0.102 | 0.102 | 0.102 | 0.102 |
| Glass Composition % by weight (Colouring agents) | | | | |
| $Fe_2O_3$ | 0.408 | 0.349 | 0.391 | 0.441 |
| $Cr_2O_3$ | 0.0193 | 0.0176 | 0.0167 | 0.0182 |
| Se | 0.00131 | 0.00167 | 0.00127 | 0.00098 |
| Co | 0.00616 | 0.00623 | 0.0065 | 0.00646 |
| Ni | 0.0080 | 0.0080 | 0.0080 | 0.0080 |
| Position on colour diagram (illuminant C) | X | U | Y | Z |
| x | 0.3072 | 0.3083 | 0.3053 | 0.3044 |
| y | 0.3250 | 0.3234 | 0.3212 | 0.3226 |
| L % | 51.9 | 51.9 | 52.0 | 51.9 |
| λD (nm) | 528 | 535 | 504 | 505 |
| P % | 1.7 | 1.5 | 1.55 | 1.85 |

TABLE 4

| Example No. | 10 | 11 | 12 | 13 |
|---|---|---|---|---|
| Batch Composition, kg for 1000 kg glass (Colourants) | | | | |
| $Fe_2O_3$ | 3.480 | 3.480 | 3.210 | 3.890 |
| $Cr_2O_3$ | 0.190 | 0.104 | 0.149 | 0.193 |
| Se | 0.101 | 0.120 | 0.099 | 0.043 |
| CoO | 0.066 | 0.062 | 0.083 | 0.084 |
| NiO | 0.127 | 0.127 | 0.076 | 0.102 |
| Glass Composition % by weight (Colouring agents) | | | | |
| $Fe_2O_3$ | 0.4219 | 0.429 | 0.395 | 0.479 |
| $Cr_2O_3$ | 0.0190 | 0.0104 | 0.0149 | 0.0193 |
| Se | 0.00151 | 0.00180 | 0.00148 | 0.00064 |
| Co | 0.00515 | 0.00489 | 0.0065 | 0.0066 |
| Ni | 0.0100 | 0.0100 | 0.0060 | 0.0080 |
| Position on colour diagram (illuminant C) | XX | UU | YY | ZZ |
| x | 0.3140 | 0.3171 | 0.3056 | 0.3022 |
| y | 0.3326 | 0.3302 | 0.3197 | 0.3223 |
| L % | 51.9 | 51.8 | 51.8 | 52.0 |
| λD (nm) | 561 | 568.5 | 500 | 500 |
| P % | 5.5 | 5.7 | 1.5 | 2.6 |

I claim:

1. Tinted soda-lime glass containing by weight the following glass forming oxides:

| $SiO_2$ | 60 to 75% |
|---|---|
| $Na_2O$ | 10 to 20% |
| CaO | 0 to 16% |
| $K_2O$ | 0 to 10% |
| MgO | 0 to 10% |
| $Al_2O_3$ | 0 to 5% |
| BaO | 0 to 2% |
| BaO + CaO + MgO | 10 to 20% |
| $K_2O + Na_2O$ | 10 to 20% | wherein such glass also contains the following colouring agents (proportions by weight):

| $Fe_2O_3$ | 0.3 | to | 0.5% |
|---|---|---|---|
| $Cr_2O_3$ | 0.0075 | to | 0.0230% |

-continued

|     |        |    |         |
|-----|--------|----|---------|
| Se  | 0.0005 | to | 0.0019% |
| Co  | 0.0040 | to | 0.0070% |
| Ni  | 0.0050 | to | 0.0120% |

2. A glass according to claim 1, wherein $Cr_2O_3$ is present in an amount below 0.0195% by weight.

3. A glass according to claim 1 or 2, wherein said colouring agents are present in such relative proportions that the purity of colour of the glass is at most 6% when illuminated by CIE illuminant C.

4. A glass according to claim 1 or 2, wherein said colouring agents are present in the following porportions by weight:

|          |        |    |          |
|----------|--------|----|----------|
| $Fe_2O_3$ | 0.35   | to | 0.45%    |
| $Cr_2O_3$ | 0.0150 | to | 0.0195%  |
| Se       | 0.0010 | to | 0.00175% |
| Co       | 0.0050 | to | 0.0070%  |
| Ni       | 0.0075 | to | 0.0100%  |

5. A glass according to claim 1 or 2, wherein said colouring agents are incorporated in such relative amounts as to impart to the glass a dominant wavelength in the range 500 nm to 570 nm when illuminated by CIE illuminant C.

6. A glass according to claim 5, wherein said colouring agents are incorporated in such relative amounts as to impart to the glass a dominant wavelength in the range 500 nm to 540 nm when illuminated by CIE illuminant C.

7. A glass according to claim 5, wherein said colouring agents are incorporated in such relative amounts as to give a position for the glass on the CIE colour diagram (illuminant C) which lies within the smallest quadrilateral enclosing the points (0.3140; 0.3326), (0.3171; 0.3302), (0.3056; 0.3197), (0.3022; 0.3223).

8. A glass according to claim 7, wherein said colouring agents are incorporated in such relative amounts as to give a position for the glass on the CIE colour diagram (illuminant C) which lies within the smallest quadrilateral enclosing the points (0.3072; 0.3250), (0.3083; 0.3234), (0.3053; 0.3212), (0.3044 0.3226).

9. A glass according to claim 1 or 2, wherein the glass has a factor of luminance between 45% and 60%.

10. A glass according to claim 1 or 2, wherein the glass is a float glass.

* * * * *